(12) United States Patent
Magouyrk et al.

(10) Patent No.: US 9,928,572 B1
(45) Date of Patent: Mar. 27, 2018

(54) LABEL ORIENTATION

(71) Applicant: Amazon Technologies, Inc., Reno, NV (US)

(72) Inventors: Clayton Matthew Magouyrk, Seattle, WA (US); Scott Robert Parish, North Bend, WA (US)

(73) Assignee: Amazon Technologies, Inc., Seattle, WA (US)

( * ) Notice: Subject to any disclaimer, the term of this patent is extended or adjusted under 35 U.S.C. 154(b) by 577 days.

(21) Appl. No.: 14/137,884

(22) Filed: Dec. 20, 2013

(51) Int. Cl.
G06T 3/60 (2006.01)

(52) U.S. Cl.
CPC ..................... G06T 3/60 (2013.01)

(58) Field of Classification Search
CPC ............. G01C 21/32; G01C 21/3673
See application file for complete search history.

(56) References Cited

U.S. PATENT DOCUMENTS

| | | | |
|---|---|---|---|
| 4,682,161 A | 7/1987 | Bugg | |
| 4,833,627 A | 5/1989 | Leszczynski | |
| 4,851,825 A | 7/1989 | Naiman | |
| 4,887,301 A | 12/1989 | Hodgens | |
| 5,321,768 A | 6/1994 | Fenrich | |
| 5,432,890 A | 7/1995 | Watanabe | |
| 5,501,538 A | 3/1996 | Sawada | |
| 5,559,938 A | 9/1996 | Van Roekel | |
| 5,609,427 A | 3/1997 | Takasawa | |
| 5,623,593 A | 4/1997 | Spells | |
| 5,684,940 A | 11/1997 | Freeman | |
| 5,746,524 A | 5/1998 | Koizumi | |
| 5,768,490 A | 6/1998 | Hersch | |
| 5,802,532 A | 9/1998 | Nakayama | |
| 5,803,629 A | 9/1998 | Neville | |
| 5,825,999 A | 10/1998 | Uzaki | |
| 5,974,876 A | 11/1999 | Hijikata | |
| 7,131,060 B1 * | 10/2006 | Azuma | G06T 11/60 715/260 |
| 7,330,787 B2 | 2/2008 | Agrawala | |
| 8,237,745 B1 | 8/2012 | Cornell | |
| 2002/0051575 A1 | 5/2002 | Myers | |
| 2003/0011599 A1 * | 1/2003 | Du | G06T 17/05 345/428 |
| 2003/0113016 A1 | 6/2003 | Naoi | |
| 2004/0004625 A1 | 1/2004 | Chao | |
| 2004/0081346 A1 | 4/2004 | Louden | |
| 2004/0107047 A1 | 6/2004 | Joshi | |
| 2005/0143914 A1 | 6/2005 | Yamada | |
| 2005/0243104 A1 * | 11/2005 | Kinghorn | G01C 21/3673 345/649 |
| 2006/0008148 A1 | 1/2006 | Mochizuki | |

(Continued)

Primary Examiner — Gregory J Tryder
Assistant Examiner — Jitesh Patel
(74) Attorney, Agent, or Firm — Pierce Atwood LLP

(57) ABSTRACT

A computing device can identify, for a placement of a label, a first and second character of the label that have a shortest distance from one another. The placement for the label can define a position at which the label is to be placed in an interactive geographic map and a formatting for that label. The computing device can determine that the first and second identified characters do not overlap. In response to determining that the first and second characters do not overlap, the computing device can select the placement of the label for display in the interactive geographic map.

12 Claims, 13 Drawing Sheets

(56) References Cited

U.S. PATENT DOCUMENTS

| | | |
|---|---|---|
| 2006/0193533 A1 | 8/2006 | Araki |
| 2006/0227349 A1* | 10/2006 | Yamaguchi ............ G06F 17/214 358/1.11 |
| 2007/0229513 A1* | 10/2007 | Bowman .............. G01C 21/367 345/467 |
| 2007/0229541 A1 | 10/2007 | Klassen |
| 2008/0031490 A1 | 2/2008 | Kobayashi |
| 2008/0109742 A1 | 5/2008 | Van Anden |
| 2008/0231643 A1 | 9/2008 | Fletcher |
| 2008/0238927 A1 | 10/2008 | Mansfield |
| 2008/0266298 A1 | 10/2008 | Hess |
| 2008/0306684 A1 | 12/2008 | Yamazaki |
| 2009/0022426 A1 | 1/2009 | Yamazaki |
| 2009/0033681 A1 | 2/2009 | Dolph |
| 2009/0066637 A1* | 3/2009 | McCall ................ G06F 1/1626 345/156 |
| 2009/0289956 A1 | 11/2009 | Douris |
| 2010/0125816 A1* | 5/2010 | Bezos ................... G06F 1/1626 715/863 |
| 2010/0131842 A1 | 5/2010 | Roose |
| 2010/0168997 A1 | 7/2010 | Sakamoto |
| 2010/0241975 A1 | 9/2010 | Kinugawa |
| 2011/0072012 A1* | 3/2011 | Ah-Pine ........... G06F 17/30274 707/725 |
| 2011/0163955 A1* | 7/2011 | Nasiri .................... A63F 13/06 345/158 |
| 2012/0078505 A1 | 3/2012 | Nakamura |
| 2012/0245841 A1 | 9/2012 | Spindler |
| 2013/0038635 A1 | 2/2013 | Bales |
| 2013/0093787 A1 | 4/2013 | Fulks |
| 2013/0129216 A1 | 5/2013 | Tsai |
| 2013/0321402 A1* | 12/2013 | Moore ............... G01C 21/3611 345/419 |
| 2014/0354629 A1* | 12/2014 | Adlers ..................... G06T 3/60 345/419 |
| 2015/0049080 A1* | 2/2015 | Purayil, Sr. ......... H04L 67/2847 345/419 |

* cited by examiner

LABEL ORIENTATION

BACKGROUND

Interactive geographic maps, e.g., maps provided by a web map service, can provide a visual representation of a geographic region. An interactive geographic map for a particular geographic region can also describe various features that appear in the particular geographic region. For example, an interactive geographic map can describe line features, e.g., roads and rivers, area features, e.g., countries, parcels, forests, and lakes, and point features, e.g., villages and cities. Each feature in an interactive geographic map can be labeled, e.g., annotated, by positioning, near the feature and in the interactive geographic map, one or more labels, e.g., map labels, that describe the feature. For example, an interactive geographic map that includes a point feature referencing the city of San Francisco can be labeled by placing a label "San Francisco" near the point feature.

Computerized methods can be used to automatically position respective labels near features in an interactive geographic map. Such computerized methods can be configured to label features in an interactive geographic map based on predefined rules, e.g., repeat labels for roads or place labels for point features in a position that is located northwest direction of the point features. These computerized methods can also apply various algorithms, e.g., simulated annealing, genetic algorithms, etc., to optimize the placement of labels for features in an interactive geographic map. For example, various algorithms can be applied to position labels in an interactive geographic map in a manner that avoids overlap with other labels.

Computerized labeling of curved line features, e.g., curved road labels, can create special challenges. For example, positioning a label for a curved line feature is generally done by positioning the characters in the label along a boundary of the curved line feature. In such instances, characters positioned incorrectly can overlap and, as a result, make the label difficult to read in a geographic map. It is difficult to predetermine character overlap for a curved line feature label since most interactive mapping applications allow for maps to be viewed at different zoom levels. That is, characters may need to be repositioned as a user zooms in and out of an interactive geographic map and can therefore make it difficult to predetermine whether characters in a label will overlap.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to placing labels in an interactive geographic map. In particular, various embodiments of the present disclosure can provide a method for determining an overlap between characters in a label placement in an interactive geographic map.

In various embodiments, before selecting labels for display in an interactive geographic map, the labels can be evaluated to determine whether characters in a label overlap with one another. As a result, a label placement that has overlapping characters and, thus, can be difficult for a user to read, is not selected for display in an interactive geographic map. Instead, upon making this determination, a system can select a different placement for that label.

Various methods can be used to determine whether characters in a placement of a label overlap. In some embodiments, an overlap exists when respective bounding boxes for characters in a label collide. In some instances, using bounding boxes to determine overlap does not take into account an orientation of the characters. Thus, in some embodiments, an overlap is determined by determining a distance between two characters, e.g., as determined using respective center coordinates for the two characters, and comparing that distance to a sum of respective radii for the two characters. As described below, a radius for a character can be determined using a width and a height of the character. In some embodiments, overlap detection between characters in a label placement can be performed both on a map server and on a client device that receives map data from the map server, as described below.

Other advantages, variations, and functions are described and suggested below as may be provided in accordance with the various embodiments.

Figure 1:
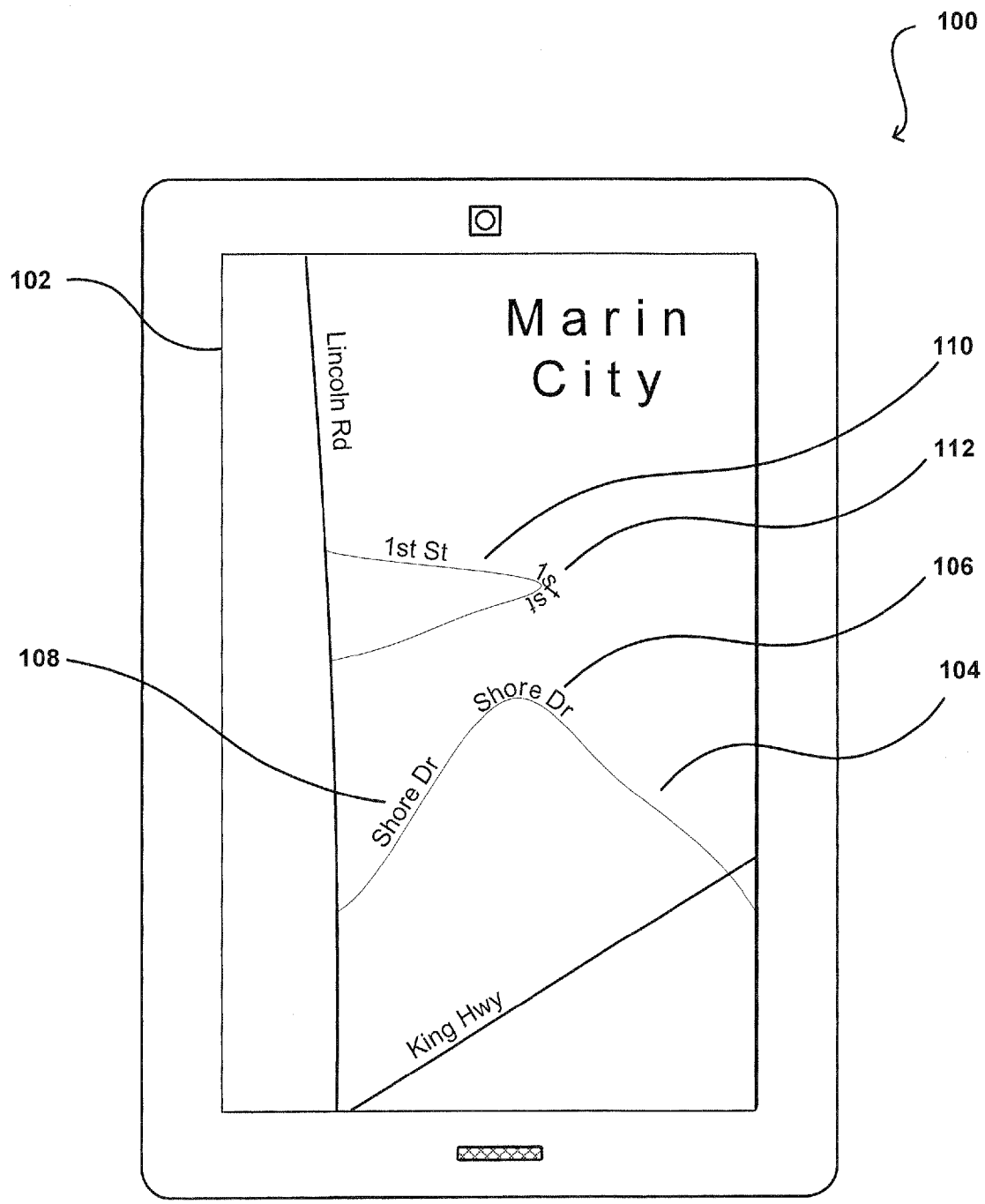
FIG. 1 illustrates an example frame for an interactive geographic map that illustrates curved line features.

FIG. 1 illustrates an example frame 102 for an interactive geographic map that illustrates curved line features, e.g., 104 and 110. The frame 102 is displayed on a display screen of a computing device 100, e.g., the device 1102, as described in reference to FIG. 11. The frame 102 was rendered using, for example, map data that was received from a map search system 1105, as described in reference to FIG. 11. In other words, the frame 102 is the portion of the interactive geographic map that is visible on the display screen of the computing device 100 at any given point.

In FIG. 1, the feature 104 is a curved road. There may be a number of candidate placements for a label that describes the feature 104. For example, a label for the feature 104 may be placed in one of several different positions that conform to a curvature of the road. Further, the label can be formatted differently, e.g., curved, depending on the position in which it is placed. For example, characters in a label can be formatted to fit a particular curve or arch. This placement of a label can affect how that label will appear in an interactive geographic map. For example, in FIG. 1, the interactive geographic map displays a label 106, e.g., "Shore Dr," for the feature 104 that is positioned in one possible placement. The label 106 is shown as being curved along a boundary of the feature 104. Similarly, another label 108 for the feature 104 is placed along another boundary of the feature 104.

When automatically placing labels, computerized methods may need to quickly determine, for each feature, which of the different possible placements of a label for that feature are the best placements. One of the considerations for placing a label for a line feature, e.g., a road or a river, is determining whether that placement would result in an overlap between characters that are in the label. For example, in some instances, the placement of a label along a curved segment of a road 110 can result in an overlap between one or more characters in the label, as illustrated by the label 112, e.g., "1st St". Such overlapping can sometimes render a label unreadable in a geographic map. Thus, in some embodiments, before placing a label in an interactive geographic map, one or more techniques, as described below, are used to determine an overlap between characters in the label. In such embodiments, a label placement that would result in overlapping characters is no longer considered as a candidate placement.

Figure 2:
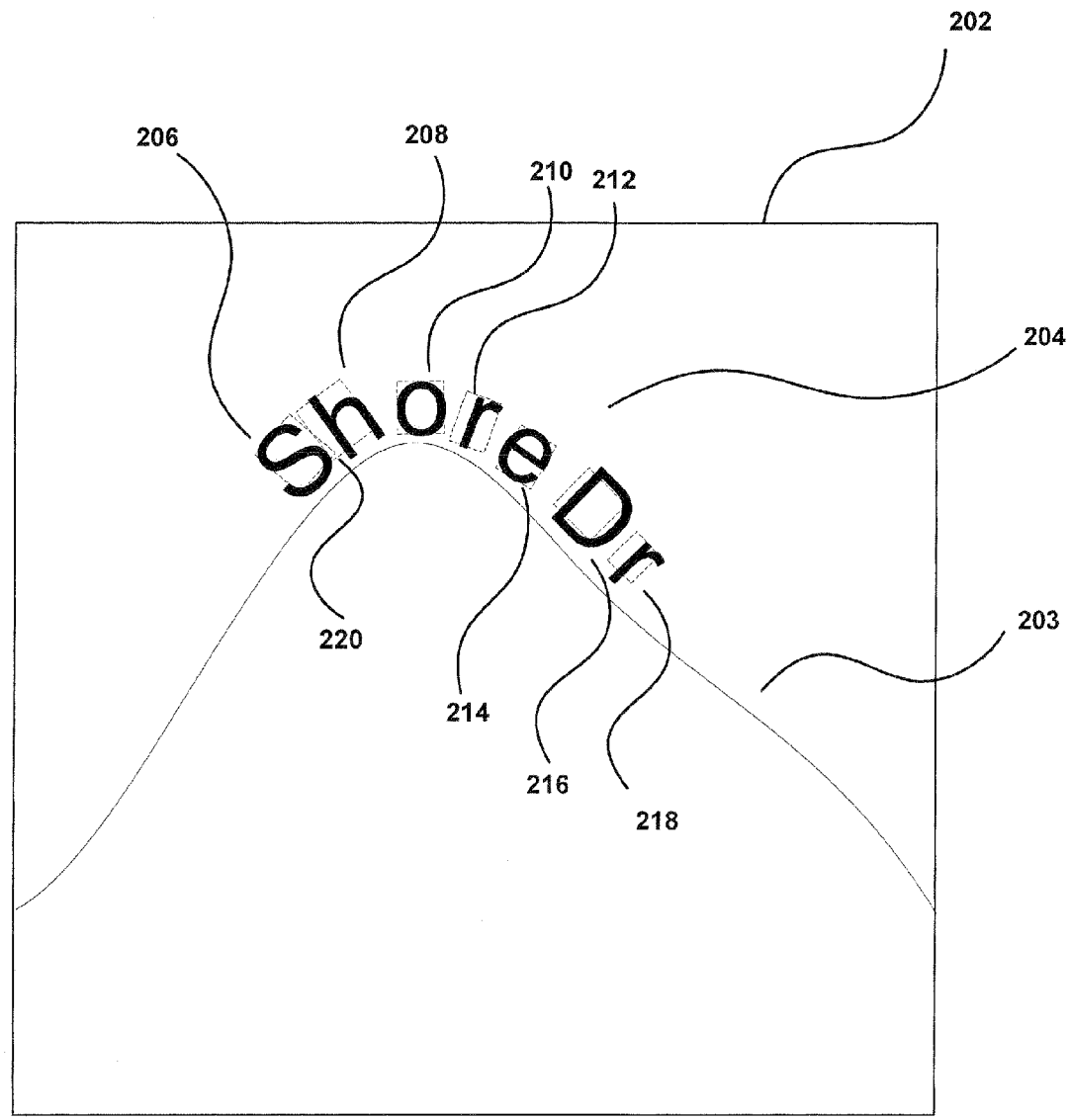
FIG. 2 illustrates an example method for determining an overlap between characters in a label.

FIG. 2 illustrates an example method for determining an overlap 220 between characters 206, 208, 210, 212, 214, 216, and 218 in a label 204. In some embodiments, the method is performed by a map search system, e.g., the system 1105, as described in reference to FIG. 11. In FIG. 2, the label 204 is shown as being placed along a road 203 in a frame 202 of an interactive geographic map.

Each frame of an interactive geographic map can describe a particular geographic region using, for example, a collection of map tiles. Further, each map tile in the collection describes a portion of the particular geographic region at some zoom level. In general, the zoom level defines a level of magnification at which a geographic map is displayed in a map viewport, for example. A user can interact with the map viewport to adjust the level of magnification within some specified range, e.g., between a zoom level of 1 to 20, inclusive. A zoom level of 1, e.g., a minimum zoom level, can display a frame of an interactive geographic map that is generated using a first collection of map tiles that describe a fully zoomed out map. In contrast, a zoom level of 20, e.g., a maximum zoom level, can display a frame an interactive geographic map that is generated using a second collection of map tiles that describe a higher resolution of the map.

As a zoom level is adjusted, e.g., increased or decreased, different labels may be selected for placement in the interactive geographic map. For example, an interactive geographic map at a minimum zoom level may describe a map of the United States that includes a label for "United States" and some other labels for each of the states. However, as the zoom level is increased, the interactive geographic map can be updated to display a more detailed geographic region, e.g., the state of Kansas, and can place labels that describe that particular geographic region, e.g., cities within the state of Kansas. Additionally, as the zoom level is adjusted, different placements may be determined for labels that were already displayed in the interactive geographic map. For example, a label "Seine River" may be placed along a particular boundary of a feature in an interactive geographic map and formatted, e.g., curved, to be displayed along the particular boundary of a feature. When the zoom level is increased, a new placement for the label "Seine River" can be determined that changes the position at which the label is placed in the interactive geographic map and also changes the formatting, e.g., curving, of the label to be displayed along a different boundary of the feature. The example above describes adjusting the orientation of an interactive geographic map by adjusting the zoom level. Changing the zoom level is one example of how a user can change an orientation of the interactive geographic map. However, the orientation of the interactive geographic map can be manipulated in other ways including, for example, rotating or tilting the map. As described above, different labels may be selected for placement in the interactive geographic map in response to such manipulation of the interactive geographic map.

In some embodiments, an overlap between characters in a label is determined by evaluating a placement of the label in an interactive geographic map at a particular zoom level. A label may appear in a frame of an interactive geographic map at different zoom levels. For example, a label for the city of San Francisco may appear in map tiles that correspond to zoom levels 3 to 8, inclusive. In some embodiments, an overlap between characters in a label is determined by evaluating the placement of the label at a minimum zoom level at which the label would appear in an interactive geographic map. For example, if a label "San Francisco" appears in an interactive geographic map at zoom levels 3 to 8, inclusive, then an overlap between the characters in the label "San Francisco" can be determined by evaluating the placement of the characters in the label "San Francisco" at zoom level 3, which, in this example, is the minimum zoom level at which the label would appear in the interactive geographic map.

In some embodiments, a respective bounding box can be drawn around each of the characters 206, 208, 210, 212, 214, 216, and 218 to determine an overlap between two characters, as illustrated in FIG. 2. An overlap between two bounding boxes can be determined using generally known collision detection techniques or using an Application Programming Interface (API), e.g., the JTS Topology Suite. The size of each bounding box for a character can be rectangular in shape and can have dimensions that are based on the size of the character. That is, the dimensions of a bounding box for a character can be determined based on a respective height and width of the character at a minimum zoom level at which the character would appear in an interactive geographic map. In some embodiments, the size of the bounding box is reduced by a percentage, e.g., 10, 25, or 50 percent. An overlap between two characters exists when there is an overlap between respective bounding boxes for those two characters. As illustrated in FIG. 2, an overlap 220 exists between the respective bounding boxes for the characters 206 and 208. Once an overlap is determined, a different placement for the label can be selected and evaluated using the techniques described in this specification. Various automatic placement techniques can be used to determine a different placement for a label including, for example, rule-based algorithms, greedy algorithms, simulated annealing, evolutionary algorithms, or a combination thereof.

Figure 3:
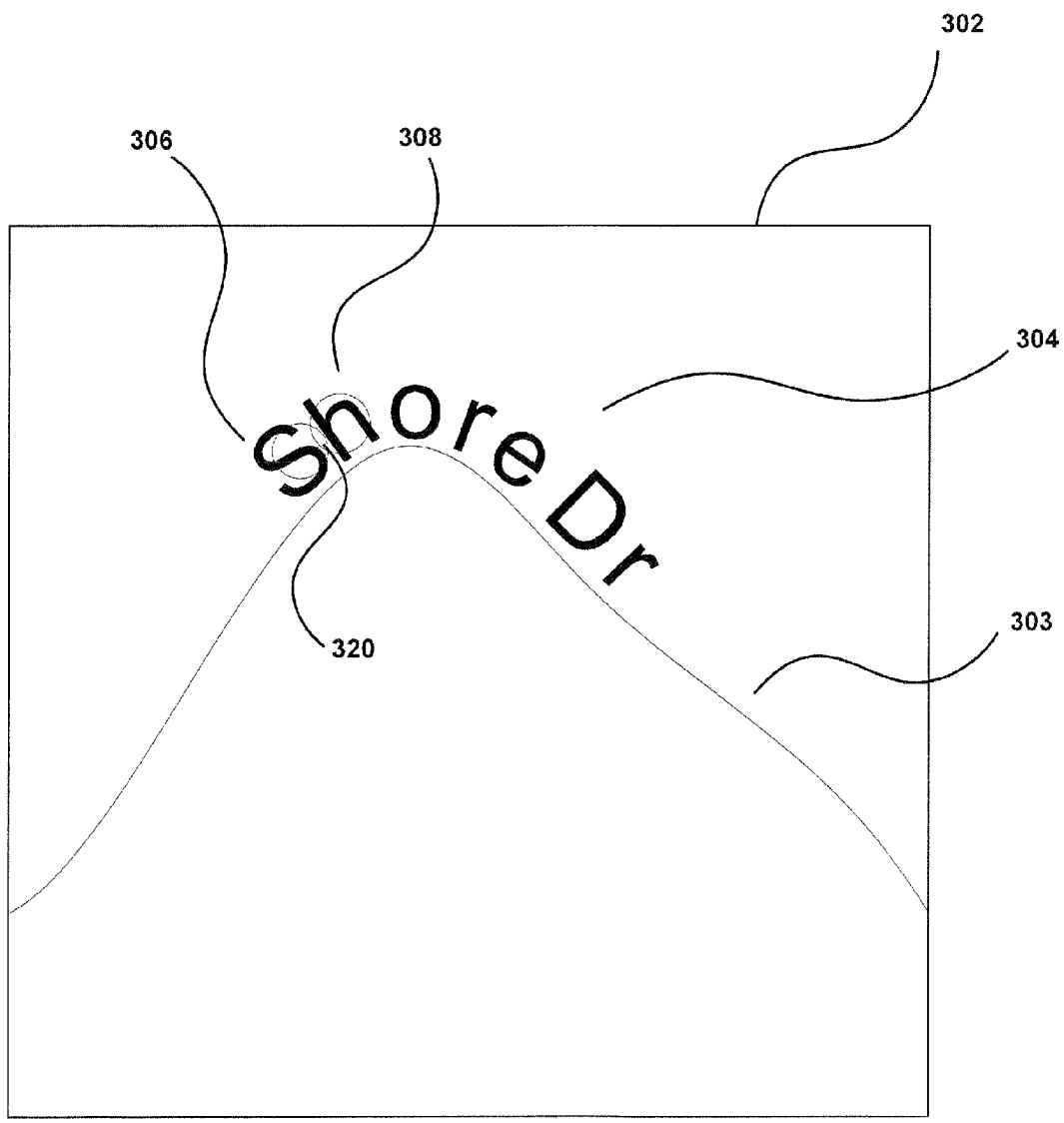
FIGS. 3-4 illustrate another example method for determining an overlap between characters in a label.

In some embodiments, an overlap between characters in a label can be any overlap between two or more characters in that label, between two or more respective bounding boxes for characters in that label, or between two or more respective radii for characters in that label, as described in FIG. 3.

FIG. 3 illustrates another example method for determining an overlap 320 between characters, e.g., the characters 306 and 308 in a label 304. In some embodiments, the method is performed by a map search system, e.g., the system 1105, as described in reference to FIG. 11. In FIG. 3, the label 304 is shown as being placed along a road 303 in a frame 302 of an interactive geographic map.

As described in reference to FIG. 2, each frame of an interactive geographic map can describe a particular geographic region using, for example, a collection of map tiles. Further, each map tile in the collection describes a portion of the particular geographic region at some zoom level. In some embodiments, an overlap between characters in a label is determined by evaluating the placement of the label at a minimum zoom level at which the label would appear in an interactive geographic map, as described above in reference to FIG. 2.

For purposes of discussion, FIG. 3 illustrates how an overlap is detected between two characters, e.g., the characters 306 and 308, in the label 304. However, in general, this method can be applied to each character of a label. That is, respective overlaps can be determined based on a pairwise comparison between each character of the label and every other character of the label.

In some embodiments, to determine an overlap between the character 306 and 308, a respective radius is determined for each of the characters 306 and 308. A radius for a character can be determined based on a width and a height of the character as that character appears in an interactive geographic map. That is, the size of the character and the font in which it will be displayed can be evaluated to determine the character's height and width. The radius for the character can be determined from the height and width using, for example, the Pythagorean Theorem. An example formula for determining the radius is reproduced below:

$$r^2=(0.5*h)^2+(0.5*w)^2$$

where r is the radius, h is the height of the character, and where w is the width of the character.

In some embodiments, the size of radius is reduced by a percentage, e.g., 10, 25, 50, or 70 percent.

A distance between respective center coordinates for each of the characters 306 and 308 is also determined. For example, a center coordinate for a character can be determined based on the width and height of the character and describes a geometric center of the character in two-dimensional space. The center coordinate for the character can be predetermined by a system, e.g., the map search system 1105, and can be described using x and y pixel coordinates. For example, a display screen can be treated as a two-dimensional coordinate system with an x-axis and a y-axis. Positions within this coordinate system can be identified using a point along the x-axis, i.e., x pixel coordinate, and a point along the y-axis, i.e., y pixel coordinate. Once the center coordinates for the characters 306 and 308 have been determined, the distance between the center coordinates can be determined using the distance formula. An example formula for determining the distance between two center coordinates is reproduced below:

$$d=\sqrt{(x_2-x_1)^2+(y_2-y_1)^2}$$

where d is the distance, $x_1$ and $y_1$ are the x and y coordinates for the first center point, and where $x_2$ and $y_2$ are the x and y coordinates for the second center point.

To determine an overlap between the characters 306 and 308, the respective radii of the characters 306 and 308 are added together and compared with the distance between the respective center coordinates for the characters 306 and 308. If the sum of the respective radii of the characters 306 and 308 is less than the distance, then there is no overlap between the characters 306 and 308. If the sum of the respective radii of the characters 306 and 308 is greater than the distance, then there is overlap between the characters 306 and 308. If the sum of the respective radii of the characters 306 and 308 equals the distance, then the characters 306 and 308 are touching. Depending on the implementation, a threshold percentage of overlap is permitted between the respective radii of the characters 306 and 308. As illustrated in FIG. 3, an overlap 320 exists between the respective radii of the characters 306 and 308. Once an overlap is determined, a different placement for the label can be selected and evaluated using the techniques described in this specification.

Figure 4:
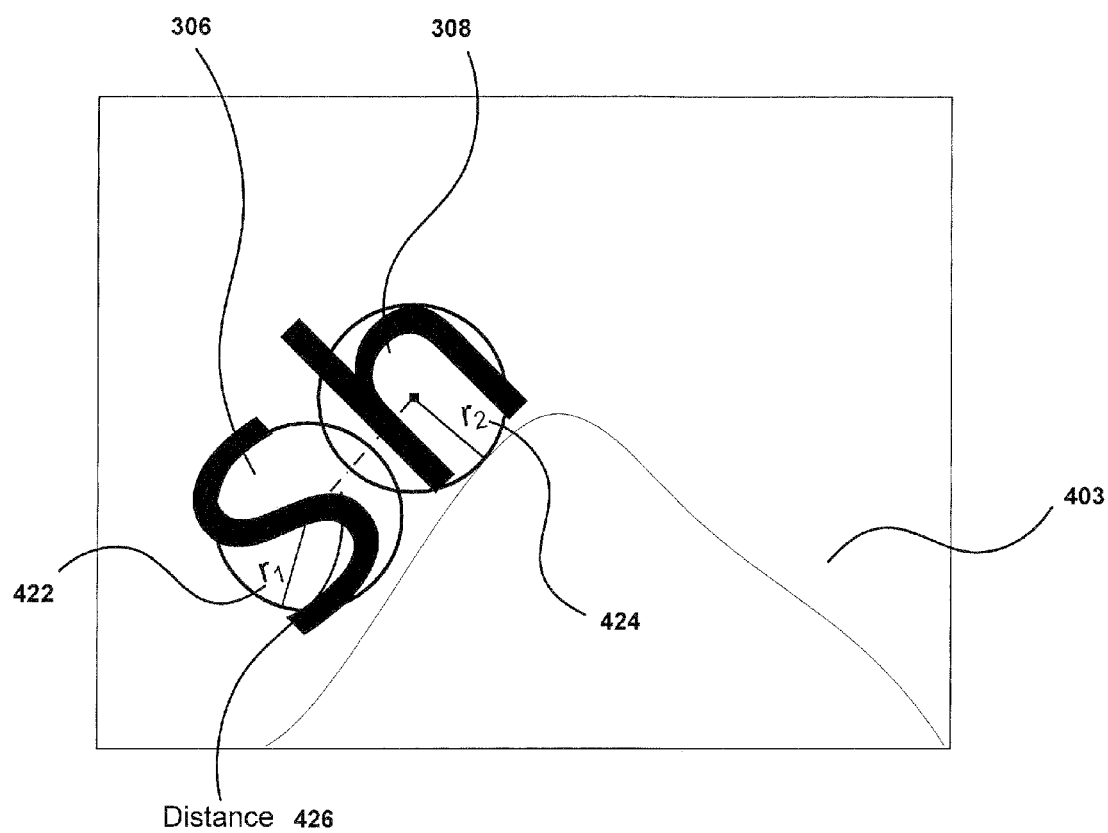

FIG. 4 shows respective radii 422 and 424 for the characters 306 and 308 that were placed along the road 303, as described in reference to FIG. 3. A distance 426 between the respective center coordinates for the characters 306 and 308 is also shown. The respective radii 422 and 424, along with the distance 426 can be used, can be used to determine an overlap between the characters 306 and 308, as described above.

Figure 11:
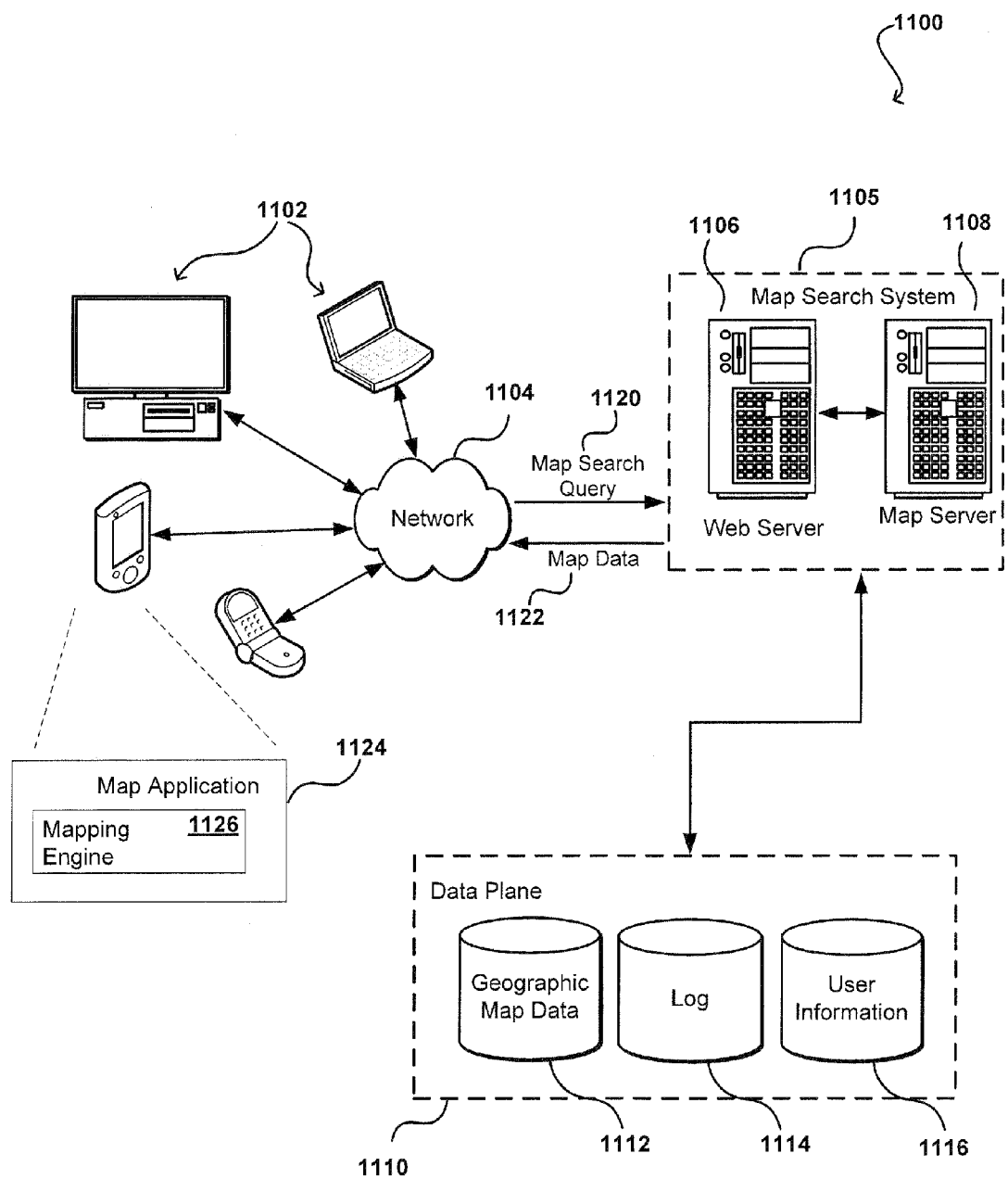
FIG. 11 illustrates an example of an environment for implementing aspects in accordance with various embodiments.

A label placement that satisfies the techniques described in FIGS. 2-4 can be provided to a client device, e.g., the client device 1102, as described in reference to FIG. 11. The client device can render an interactive geographic map using the label placement, as described below.

Given the nature of interactive geographic maps, there may be instances in which further evaluation is needed for label placements that were selected by a map search system, e.g., the system 1105. For example, the map search system may have selected particular label placements because such placements did not have overlapping characters at a particular zoom level. However, the same label placements that were selected by the map search system may have overlapping characters at a different zoom level. Thus, in some embodiments, when a user adjusts the zoom level for an interactive geographic map, the label placements are reevaluated, e.g., by the client device displaying the interactive geographic map, to determine whether characters in the label placements overlap.

The client device can determine whether characters in a label placement overlap using, for example, the technique described in FIGS. 3-4 above. However, determining an overlap between characters for every label placement in an interactive geographic map using a client device can cause performance issues. Thus, in some embodiments, before determining whether characters in a label placement overlap, the client device removes from consideration, e.g., filters, characters in the label placement that exceed a minimum overlap threshold distance. That is, the client device can iterate over each character of a label placement along the x-axis and determine whether a distance between a position of a character along the x-axis and a position of the character's successor character along the x-axis exceeds the minimum overlap threshold distance. A position of a character along the x-axis can be determined using the x-value of the character's center coordinates. If the distance exceeds the minimum overlap threshold distance, then that successor character is removed from further consideration in determining an overlap between the successor character and some other character of the label placement.

For example, assuming a minimum overlap threshold distance of 10 units, if the a position of a first character along the x-axis is at position 50 and a position of a second successor character along the x-axis is at position 62, then the distance of the second successor character from the first character is 12 units. Since 12 units exceeds the threshold distance of 10 units, the second successor character can be removed from further consideration in determining an overlap between the second successor character and some other character of the label placement.

Similarly, the client device can iterate over each character of a label placement along the y-axis and determine whether a distance between a position of a character along the y-axis and a position of the character's successor character along the y-axis exceeds the minimum overlap threshold distance. A position of a character along the y-axis can be determined using the y-value of the character's center coordinates. If the distance exceeds the minimum overlap threshold distance, then that successor character is removed from further consideration in determining an overlap between the successor character and some other character of the label placement. In some embodiments, the minimum overlap threshold distance for a label placement is twice the width of the largest character of the label placement, for example, as determined based on the font, size, height, and width of the characters in the label placement.

Once the filtering is complete, the client device can apply a recursive divide-and-conquer approach on the remaining characters in the label placement to identify the two characters in the label placement that have the shortest distance from one another. After identifying the two closest characters, the client device can determine whether an overlap exists between the two closest characters using, for example, the techniques described above. For example, to determine an overlap between the two closest characters, the client device can compare a sum of the respective radii of the two closest characters with the distance between the respective center coordinates for the two closest characters, as described above.

If an overlap between the two closest characters exists, the client device no longer displays uses that label placement and replaces it with a different label placement for that frame of the interactive geographic map. Depending on the embodiment, this process is repeated for label placements in response to further user interaction, e.g., zooming in or out, with the interactive geographic map.

Figure 5:
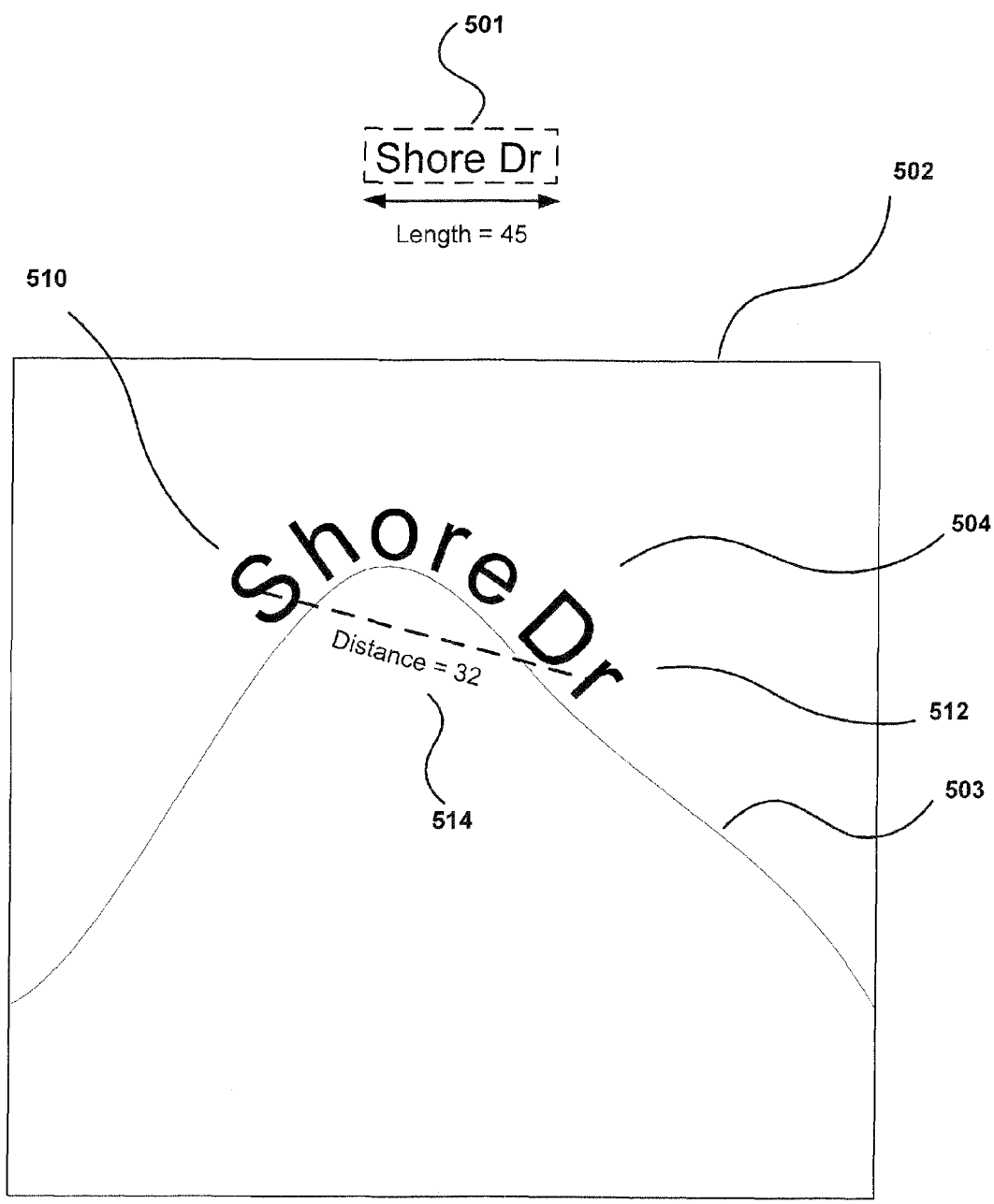
FIG. 5 illustrates an example method for determining a curvature for a label placement.

FIG. 5 illustrates an example method for determining a curvature of a label placement 504. In some embodiments, the curvature of a label placement can be used to determine whether that particular label placement is further evaluated using the techniques described in FIGS. 2-4. In order words, when determining label placements, respective curvatures of the label placements can be determined to filter placements that do not satisfy a threshold curvature. Label placements that satisfy a threshold curvature, for example, label placements that are generally straight, can be further evaluated using the techniques described in FIGS. 2-4. A label placement that does not satisfy a threshold curvature will not be selected for display since such label placements may result in overlapping characters and, therefore, are undesirable.

In some embodiments, a curvature of a label placement is determined by a ratio of a numerator that represents a distance between a first character of the label and a last character of the label and a denominator that is the length of the label. For example, in FIG. 5, a label 504 "Shore Dr," is placed along a road 503 in an interactive geographic map. A distance 514 between the first character 510, e.g., "S", and the last character 512, e.g., "r", in the label 504 can be determined by determining a distance between the center coordinates for the first character 510 and the center coordinates for the last character 512. The distance formula, as described above, can be used to determine the distance between the first and last characters in the label. The length of the label 504 can be determined by measuring a width of each character of the label 504 based on a font and font size with which the character will be rendered in an interactive geographic map. A ratio that is equal to one means that the label placement has no curvature and is considered a straight label. A ratio that is closer to zero means that the label placement is curved. In some embodiments, label placements that do not satisfy a threshold curvature are no longer considered for placement in an interactive geographic map. In such embodiments, label placements that satisfy the threshold curvature are further evaluated using the techniques described in FIGS. 2-5.

Figure 6:
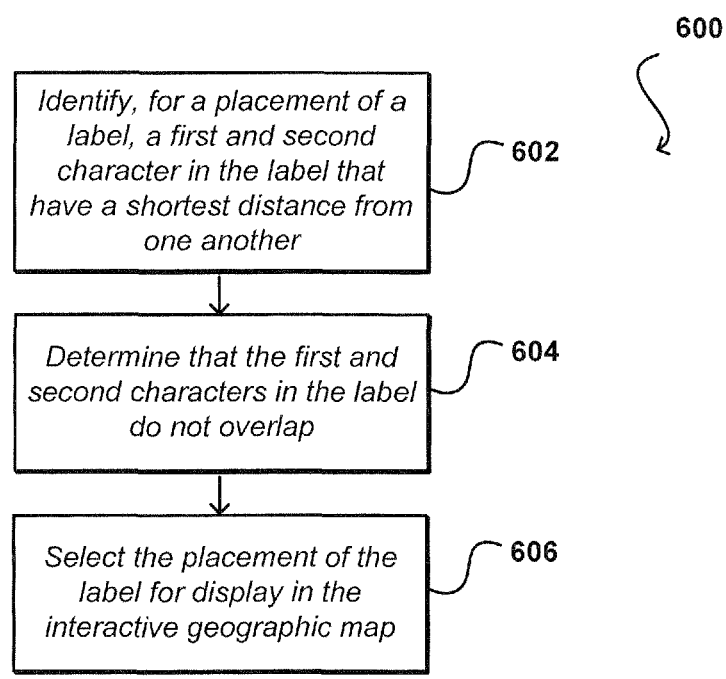
FIG. 6 is a flow diagram of an example process for filtering a label based on an overlap between characters in a label.

FIG. 6 illustrates a flow diagram of an example process 600 for selecting a label based on an overlap of characters in the label. The example process 600 is provided merely as an example and additional or fewer steps may be performed in similar or alternative orders, or in parallel, within the scope of the various embodiments described in this specification. A computing device identifies, for a placement of a label, a first and second character of the label that have a shortest distance from one another 602. The placement for the label defines a position at which the label is to be placed in an interactive geographic map and a formatting, e.g., curvature for that label.

The computing device determines that the first and second characters in the label do not overlap 604. For example, the computing device can determine that the first and second characters do not overlap by determining that respective bounding boxes for the first and second characters do not collide. In another example, the computing device can determine that the first and second characters do not overlap by determining that a sum of respective radii of the first and second characters is less than a distance between respective center coordinates for the first and second characters. The center coordinates can identify a position of a character in an interactive geographic map. In response to determining that the first and second characters in the label do not overlap, the computing device selects the placement of the label for display in the interactive geographic map 606.

Figure 7A:
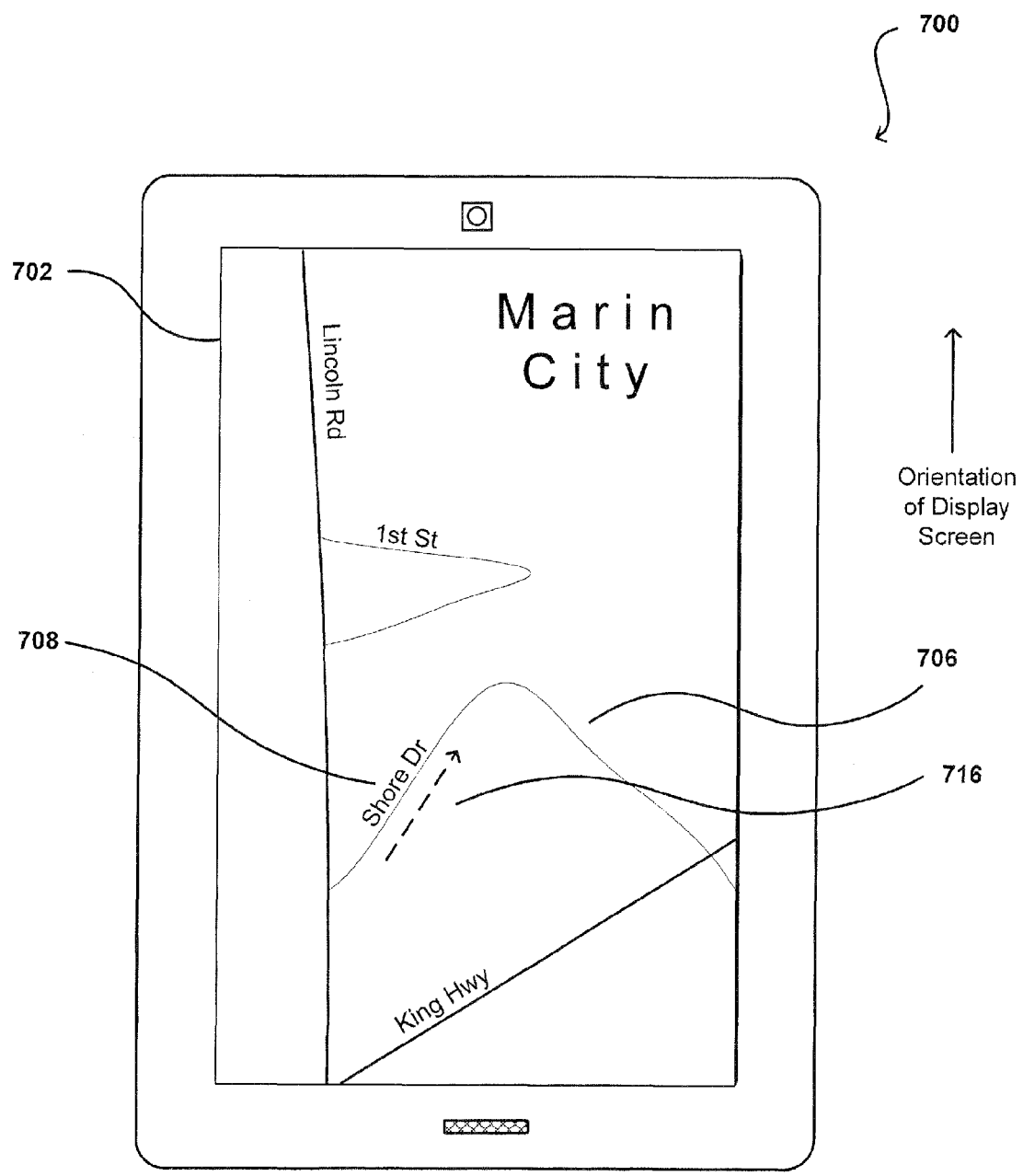
FIGS. 7A-B illustrate example frames in an interactive geographic map that illustrate different orientations for a placement of a label.

FIG. 7A illustrates an example frame 702 for an interactive geographic map that illustrates line features, e.g., 704 and 706. The frame 702 is displayed on a display screen of a computing device 700, e.g., the device 1102, as described in reference to FIG. 11. The frame 702 was rendered using, for example, map data that was received from a map search system 1105, as described in reference to FIG. 11.

The frame 702 is similar to the frame 102 that was described in reference to FIG. 1. In some embodiments, an interactive geographic map can be rotated in response to a change in the orientation of a computing device. Thus, in FIG. 7, the frame 702 has been rotated in response to a change in the orientation of the computing device 700. Consequently, as the interactive geographic map rotates, labels that identify line features, e.g., rivers, roads, borders between territories, in the interactive geographic map are also rotated to orient the labels in a direction along their respective line features, as those line features rotate about in the interactive geographic map. For example, a label can be positioned at a particular location in an interactive geographic map. When the computing device 700 rotates, the label can rotate around the particular location in which it was positioned.

In such situations, as the interactive geographic map is rotated, it is possible for placements for labels in the interactive geographic map to become inverted, e.g., upside down. This can make the interactive geographic map more difficult for a user to read.

Thus, in some embodiments, angles for placements of labels are tracked and aligned with respect to an orientation, e.g., display screen, of the computing device 700 that is displaying the interactive geographic map. When an angle for a label that is displayed at a first orientation, e.g., right way up, crosses, e.g., satisfies, a threshold reference point, the label is flipped to be displayed at a second orientation, e.g., upside down. In other words, the second orientation for the label can be an orientation that is rotated 180 degrees, or within a threshold range from 180 degrees, from the first orientation. In some embodiments, the threshold reference point is defined based on a reference point, e.g., 0 or $\pi$ radians, that is offset by a constant, e.g., 0.1 radians, as described below.

Figure 7B:
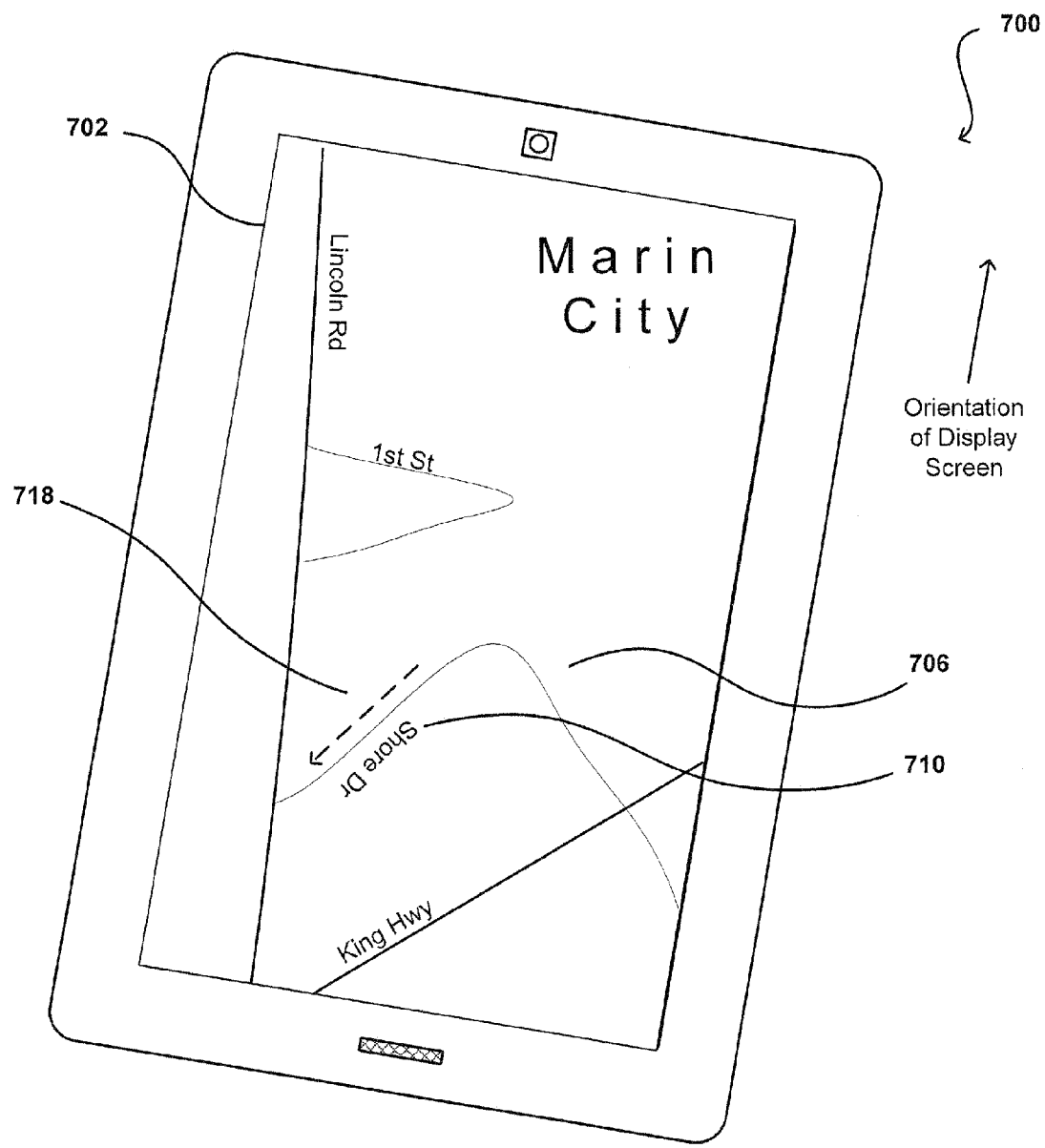

However, such rotating or changing the orientation of the computing device 700, can result in a label flipping between a first orientation, e.g., the label 708 as described in reference to FIG. 7A, and second orientation, e.g., the label 710 as described in reference to FIG. 7B. Such flipping of a label can be distracting to a user that is viewing the interactive geographic map.

Thus, to control such flipping, in some embodiments, when an angle for a label that is positioned at a first orientation crosses a threshold reference point, the label is flipped to its second orientation. For example, in response to a rotation of the computing device 700, the label can rotate in a counter-clockwise direction at a certain angle toward a threshold reference point that is defined by a reference point of 180 degrees plus a constant of 5 degrees, e.g., 185 degrees. Once the angle rotates across the threshold reference point, the threshold reference point is adjusted by the same constant in the opposite, e.g., clockwise, direction. For example, in response to a rotation of the computing device 700, the label can rotate in a clockwise direction at a certain angle toward the adjusted threshold reference point that is defined by the reference point of 180 degrees minus the constant of 5 degrees, e.g., 175 degrees.

Thus, the label stays at its second orientation until, in response to a rotation of the computing 700, the angle for the label crosses the adjusted threshold reference point. Such adjusting of the threshold reference point between frames of the interactive geographic map can prevent the flipping of a label between its first and second orientations.

Since one of the goals of placing labels in the interactive geographic map is to increase readability, placements of labels can be oriented with respect to the display screen of the computing device 700 based on what direction is determined to be vertically up, e.g., physically up. The orientation of the computing device 700 may be determined using one or more accelerometers that are in the computing device 700. This orientation indicates a direction in which the computing device 700 is facing. In some embodiments, the orientation of the computing device 700 is determined using one or more head tracking techniques. In such embodiments, the placements of labels can be oriented with respect to a direction of the eyes or head of a user operating the computing device 700.

In some embodiments, an angle for a label is initially determined in world space. World space represents a geographic map of the world in three-dimensional space. Particular features, e.g., roads, can be identified in world space using their corresponding world coordinates. The angle of the label in world space can be represented using pixel coordinates to determine an angle for the label in two-dimensional space. When determining the angle for the label in world space, respective vectors are determined beginning from the first character in the label to each other character in the label. For example, for the label "Z St," a first vector is determined beginning from the first character "Z" to the character "S" and a second vector is determined beginning from the first character "Z" to the character "t". These vectors can be determined using equal weighting or width weighting, depending on the implementation. The angles of the respective vectors beginning from the first character in the label to each of the other characters in the label are averaged to determine the angle for a placement for the label. In some embodiments, a vector generally describes a geometric quantity that has a magnitude, e.g., length, and a direction that is expressed numerically, for example, as an ordered list of tuples, e.g., [x, y, z], that describe the vector along axis components.

The angle for the placement for the label typically needs to be converted from world space to a screen coordinate system, e.g., pixel coordinates, so that the angle is calibrated to the display screen of the computing device 700. By way of example, FIG. 7A shows an angle 716 that was determined for the label 708 that is positioned in an up direction. In contrast, FIG. 7B shows an angle 718 that was determined for the label 710 that is positioned in a down direction.

In some embodiments, an angle for a label in an interactive geographic map is determined in world space by a map server system, e.g., by the system 1105, as described in reference to FIG. 11, and provided with map data for a geographic region, as also described in reference to FIG. 11. In such embodiments, a computing device, e.g., the device 700, converts the angle from world space to screen coordinates, e.g., pixel coordinates, with respect to an orientation of the computing device.

Upon conversion to screen coordinates, the angle for the label can be evaluated with respect to an orientation of the computing device 700. For example, an angle for a label can range from 0 to $2\pi$ radians. In some embodiments, 0 and $\pi$ radians are considered threshold reference points at which a label will flip between a first orientation and a second orientation. In some embodiments, the threshold reference point for a label is defined by a reference point, e.g., $\pi$ radians, that is adjusted, e.g., offset, by some constant, e.g., 0.1 radians, in response to the label flipping from a first orientation to a second orientation.

For example, for a label to flip from a first orientation to a second orientation, a threshold reference point can be defined by a reference point $\pi$ radians plus a constant, e.g., 0.1 radians. Once the angle for the label flips to the second orientation, the threshold reference point is adjusted to $\pi$ radians minus the constant, e.g., 0.1 radians. Thus, the angle for the label must rotate in the opposite direction and cross the adjusted threshold reference point to flip back to the first orientation.

Figure 8:
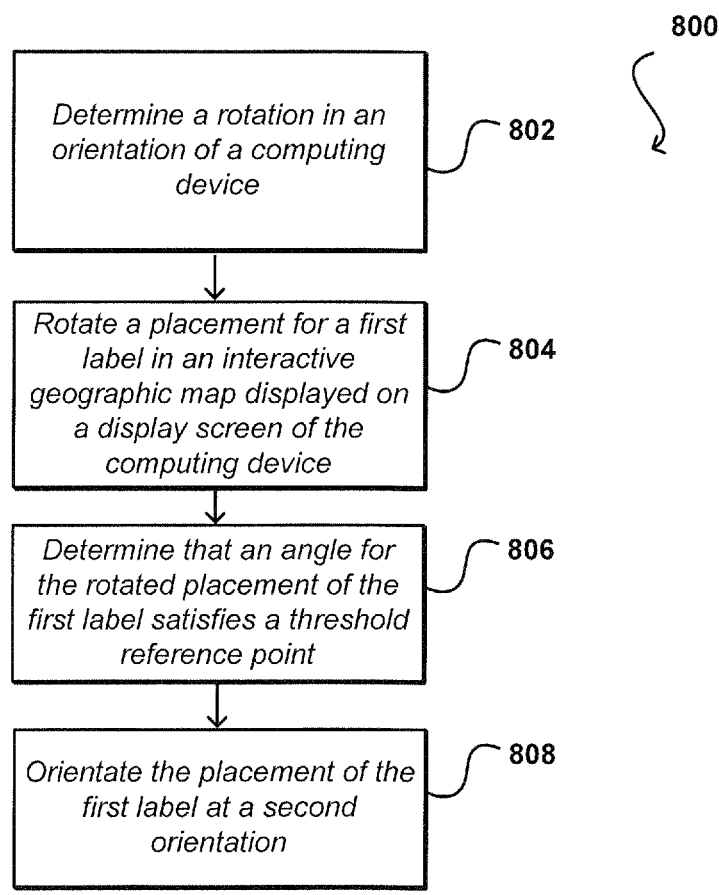
FIG. 8 is a flow diagram of an example process for determining when to change an orientation for a placement of a label.

FIG. 8 is a flow diagram of an example process 800 for changing the orientation for a label. The example process 800 is provided merely as an example and additional or fewer steps may be performed in similar or alternative orders, or in parallel, within the scope of the various embodiments described in this specification. A computing device determines a change in an orientation of the computing device 802.

In response to determining the change in the orientation of the computing device, the computing device rotates a first label in an interactive geographic map displayed on a display screen of the computing device, 804. The first label can be oriented at a first orientation in the interactive geographic map. The computing device determines that an angle for the rotated first label satisfies a threshold reference point 806. In response to determining that the angle for the rotated first label satisfies a threshold reference point, the computing device orientates the first label at a second orientation 808.

Figure 9:
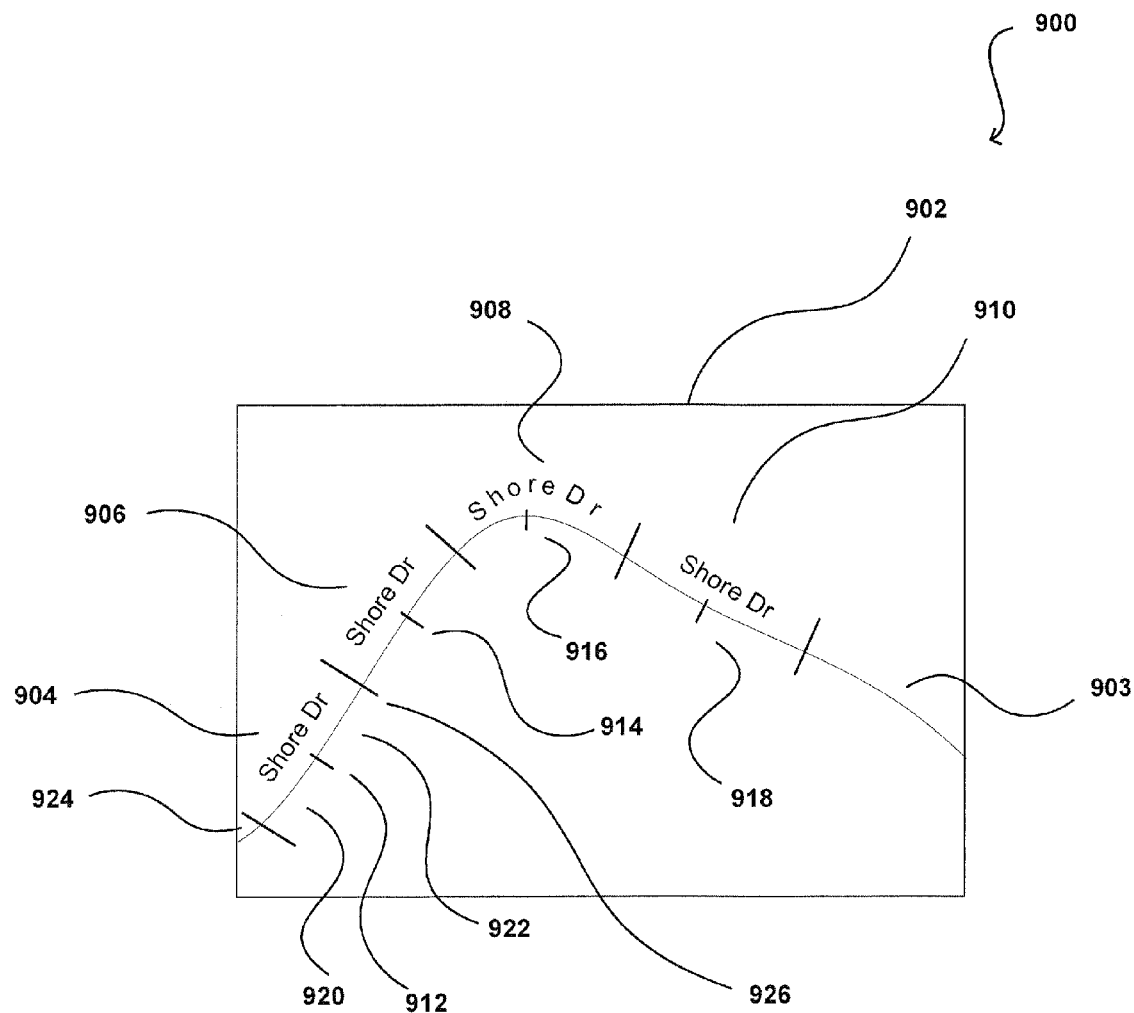
FIG. 9 illustrates an example method for determining label placements for a line feature.

FIG. 9 illustrates an example method for determining label placements 904, 906, 908, and 910 for a line feature 903. In some embodiments, the method is performed by a map search system, e.g., the system 1105, as described in reference to FIG. 11. In FIG. 9, the label placements 904, 906, 908, and 910 are shown as being placed along a road, i.e., a line feature, 903 in a map tile 902 of an interactive geographic map. The road 903 is made up of segments 912, 914, 916, and 918. Each segment can be divided into sub-segments. For example, segment 912 is shown as having been divided into a first sub-segment 920 and a second sub-segment 922.

When generating map tiles to send to a client device, for example, in response to a map search query, a system, e.g., the map search system 1105, determines where to place labels for line features, e.g., roads, that appear in the map tiles. Typically, data describing the line feature, e.g., the road 903, is made up of a series of segments, e.g., segments 912, 914, 916, and 918. When generating a map tile that includes that line feature 903, the segments 912, 914, 916, and 918, for the line feature 903 in that map tile 902 are joined together using generally known techniques. The system then determines placement positions for a label for the line feature 903 in the map tile 902 based on the length of the label, e.g., the label "Shore Dr," and on the geometry, e.g., curvature, of the line feature 903. The system determines a number of different possible placements for that label, e.g., placements 904, 906, 908, and 910, and then determines which of the possible placements are the best placements for that label, as described below.

Generally, when determining the number of different possible placements for a label for the line feature 903, the system iterates over segments, e.g., the segment 912, for the line feature and identifies sub-segments, e.g., the sub-segments 920 and 922, that are long enough to include the label. The number of sub-segments identified can vary based on the length of the label. For example, a label "1st St." requires a fewer number of sub-segments than a label "Martin Luther King Jr. Dr." In some embodiments, to identify sub-segments for a label placement, the system determines a length of a label for a line feature at the zoom level at which the map tile is being generated.

The system then identifies the first segment 912 of the line feature 903 as a sub-segment. During this identification, the beginning of the first segment 912 is identified as the start point 924 and the end of the first segment 912 is identified as the end point 926.

If the sub-segment, as defined by the start point 924 and the end point 926, is smaller than the length of the label "Shore Dr," then the system increments the end point 926 to include the next segment 914 of the line feature 903. This incrementing continues in a similar manner until the sub-segment, as defined by the start point 924 and the end point 926, is long enough to include the length of the label "Shore Dr." Thus, in this example, if the label for the line feature 903 was "Martin Luther King Jr. Dr" and the sub-segment was defined by the start point 924 and the end point 926, then the system could adjust the sub-segment by incrementing the end point 926 to include the next segment 914, so that the length of the new sub-segment is long enough to include the label "Martin Luther King Jr. Dr."

However, if the sub-segment, as defined by the start point 924 and the end point 926, is larger than the length of the label "Shore Dr," as shown in the example of FIG. 9, then the system adjusts the start point 924 of the sub-segment along the line segment 903 until the sub-segment can no longer be reduced without becoming smaller than the length of the label "Shore Dr." Once a sub-segment that fits the label "Shore Dr" has been identified, the system generates a score for the sub-segment.

The sub-segment score is used to identify the best placements for a label along the line feature 903. In some embodiments, the sub-segment score is based on a curvature of a label placement within the sub-segment and the distance of the sub-segment from the center of the line feature 903.

The curvature of the label placement can be determined using the method described above in reference to FIG. 5. In some embodiments, the distance of the sub-segment from the center of the line feature 903 is determined by subtracting a center point of the sub-segment from the center point of the line feature 903. To generate the sub-segment score, a first value can be determined by dividing the distance of the sub-segment from the center of the line feature 903 by a fraction, e.g., one-third, one-fourth, or one-half, of the total length of the line feature 903. The first value can be adjusted, e.g., multiplied, by a weight. Next, the curvature of the label placement can also be adjusted, e.g., multiplied, by a different weight. The adjusted first value and the adjusted curvature of the label placement can be added together to generate the sub-segment score. Other ways of adjusting the sub-segment score are possible. For example, label placements that are close to road intersections can be weighted lower than those that are further away. Label placements that are more horizontal can be weighted higher than those that are more vertical. Label placements that are closer to major roads can be weighted higher than those that are not.

Additional sub-segments can be identified along the line feature 903, as described above. For example, after identifying the sub-segment above, the system can traverse along the line feature 903 to the next line segment to determine the next sub-segment that can fit another placement of the label "Shore Dr," and determine that sub-segment's respective score. In instances where no sub-segments in the line feature 903 that can fit the label "Shore Dr," but the line feature 903 itself is long enough to fit the label "Shore Dr," the system identifies the line feature 903 as the sub-segment in which the label "Shore Dr" can be placed.

The best sub-segments for placement of the label "Shore Dr," along with their respective scores, can be identified after determining all of the potential sub-segments for the line feature 903. In some embodiments, when determining the best sub-segments from the potential sub-segments for the line feature 903, the system can first select, from the list of potential sub-segments, the sub-segment having the lowest score and add that sub-segment to a list of kept sub-segments.

The system can select, from the list of potential sub-segments, the sub-segment having the next lowest score and can evaluate the selected sub-segment with sub-segments in the list of kept sub-segments. When evaluating the selected sub-segment, the system can determine whether the selected sub-segment overlaps with other sub-segments in the list of kept sub-segments. If an overlap exists, the selected sub-segment is discarded and no longer considered as a potential sub-segment. If no overlap exists, the selected sub-segment is added to the list of kept sub-segments. This process continues for each sub-segment in the list of potential sub-segments.

Once the list of kept sub-segments has been generated, the system evaluates each sub-segment in the list of kept sub-segments by placing the label "Shore Dr" on the sub-segment. If the length of the sub-segment is greater than or equal to twice the length of the label "Shore Dr," the system splits the sub-segment into as many possible smaller sub-segments that can fit within the sub-segment and can each fit the label "Shore Dr." If the length of the sub-segment is not greater than or equal to twice the length of the label, then no splitting of the sub-segment is performed.

Additional operations then performed on each sub-segment in the list of kept sub-segments, including the sub-segments that resulted from splitting a sub-segment, as described above, to ensure that the sub-segment will be legible. Generally, a label is illegible if the line feature is so curvy that characters of the label will be drawn on top of each other. To identify the best sub-segments, on each sub-segment in the list of kept sub-segments, including the sub-segments that resulted from splitting a sub-segment, is evaluated to determine if placing the label "Shore Dr" in that sub-segment would result in characters of the label overlapping. Character overlap can be determined using the methods described above in reference to FIGS. 2-4.

If no character overlap for the sub-segment is determined, then the sub-segment is used for placing the label "Shore Dr" along the line feature 903. The position and respective score for the sub-segment is stored and can be provided to a client device when providing data describing a map tile in which the line feature 903 appears. The score can be used by the client device, for example, to place labels when generating an interactive geographic map. For example, when selecting a single label, the client device can pick the best label, based on the respective scores of the label placements, that is not obscured by other labels and is closest to the center of the screen.

In some embodiments, the process described above can be performed by dividing the line feature into fixed sub-segments, and by placing labels at a fixed spacing in those sub-segments. Label placements that are illegible, as determined using the methods above, are discarded and do not appear in the line feature.

Figure 10:
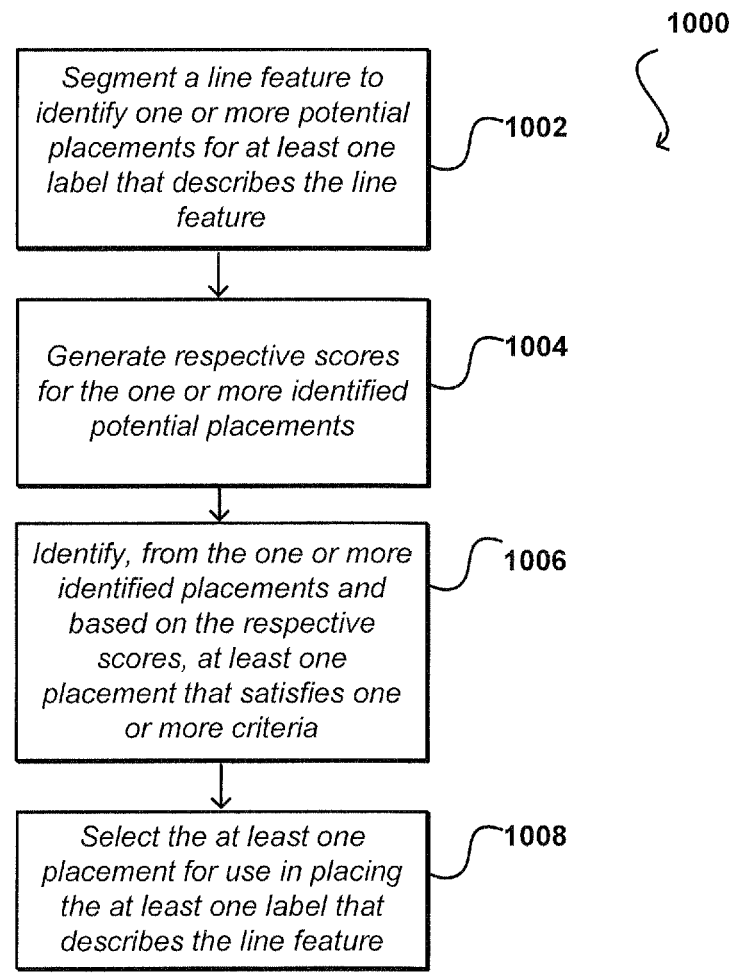
FIG. 10 is a flow diagram of an example process for selecting label placements for a line feature.

FIG. 10 is a flow diagram of an example process for selecting label placements for a line feature. The example process 1000 is provided merely as an example and additional or fewer steps may be performed in similar or alternative orders, or in parallel, within the scope of the various embodiments described in this specification. A computing device segments a line feature to identify one or more potential placements for at least one label that describes the line feature 1002. The computing device generates respective scores for the one or more identified potential placements 1004. The computing device identifies, from the one or more identified placements and based on the respective scores, at least one placement that satisfies one or more criteria 1006. The computing device selects the at least one placement for use in placing the at least one label that describes the line feature 1008.

FIG. 11 illustrates an example of an environment 1100 for implementing aspects in accordance with various embodiments. Although a web-based environment is described for purposes of explanation, different environments may be used, as appropriate, to implement various embodiments.

The example environment 1100 includes a map search system 1105 and a data plane 1110. The map search system 1105 includes at least one web server 1106 and at least one map server 1108, as described below. The map search system 1105 is an example of an interactive geographic map retrieval system implemented as computer programs on one or more computers in one or more locations, in which the systems, components, and techniques described below can be implemented.

A user can interact with the map search system 1105 through a client device 1102. For example, the client device 1102 can be a computer coupled to the map search system 1105 through a data communication network 1104, e.g., the Internet. In some instances, the map search system 1105 can be implemented on the client device 1102, for example, through a software application executing on the client device 1102. The client device 1102 generally includes a memory, e.g., a random access memory (RAM), for storing instructions and data, and a processor for executing stored instructions. The client device 1102 can be any appropriate device operable to send and receive requests, messages, or other types of information over the network 1104. The client device 1102 can also include a display screen though which a user interacting with the client device can view information, e.g., interactive geographic maps. Some examples of client devices include personal computers, cellular phones, handheld messaging devices, laptop computers, set-top boxes, personal data assistants, electronic book readers, tablet devices, and the like.

The network 1104 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The client device 1102 can communicate over the network using wired or wireless connections, and combinations thereof.

A user can use the client device 1102 to submit a map search query 1120 to the map search system 1105. The map search query 1120 can request an interactive geographic map for a particular geographic region that is identified by a geographic address, e.g., a street address, city, state, zip code, geographic coordinates, or a name of a point of interest. When the user submits the map search query 1120, the query 1120 may be transmitted through the network 1104 to a map server 1108 within the map search system 1105. The map server 1108 responds to the query 1120 by using, for example, the geographic map data 1112, to identify map data 1122 describing a geographic region that satisfies the query 1120. The map server 1108 sends the map data 1122 through the network 1104 to the client device 1102 for presentation to the user.

The map data 1122 can include data describing a map of the particular geographic region. The map data 1122 can be used, for example, by a client device 1102, to generate an interactive geographic map that provides a visual, e.g., two-dimensional or three-dimensional, representation of the particular geographic region.

The map data 1122 can describe the map of the particular geographic region using, for example, a collection of map tiles at a specified zoom level. For example, in response to a map search query for the city of San Francisco, the map server 1108 can identify a collection of map tiles that collectively describe a map of the city of San Francisco at a specified zoom level. Each map tile in the collection visually describes a portion of the map of San Francisco at the specified zoom level. Different types of maps of a geographic region may be provided depending on the user's selection including, for example, road maps, satellite maps, a hybrid maps, e.g., a combination of normal and satellite views, or physical maps based on terrain information.

Further, the map data 1122 can also include a collection of labels, e.g., text labels, icons, or both, for the requested geographic region. Each label can describe a feature that is located in the requested geographic region. Some examples of features include line features, e.g., roads and rivers, area features, e.g., countries, parcels, forests, and lakes, and point features, e.g., cities and points of interest. The map data 1122 can also include, for each label, respective coordinates that specify a location at which the label is to be positioned in an interactive geographic map. Coordinates for labels can be specified by a user, e.g., a cartographer, or may be generated by the map server 1108. For example, a label "San Francisco" can be assigned coordinates so that the label is positioned in a centrally located map tile in a collection of map tiles for the city of San Francisco.

In some embodiments, the map server 1108 generates respective popularity scores for labels that correspond to a particular geographic region. A label's popularity score generally indicates the popularity of the label for a particular geographic region. Label popularity scores can be used, for example, to prioritize the selection of labels to be displayed in an interactive geographic map. Generally, the higher the popularity score, the more relevant a label is to a particular geographic region. For example, businesses "ABC Inc.", "B2B Corp.", and "B2C P.C." can all be located in the same building in a particular geographic region. Each business can have a respective label that describes the business and a respective popularity score associated with the label. For example, labels for the businesses "ABC Inc.", "B2B Corp.", and "B2C P.C." can be respectively scored 0.7, 0.4, and 0.8. When generating an interactive geographic map for the particular geographic region, the client device 1102 can evaluate the respective scores associated with the labels to select labels for display in the interactive geographic map. In the example above, the client device 1102 selects the label "B2C P.C." for display at the building's location in the interactive geographic map, since that label has the highest popularity score.

After receiving the map data 1122 from the map server 1108, and through the network 1104, a software application, e.g., web browser or a map application 1124, running on the client device 1102 renders an interactive geographic map for the requested geographic region using the map data 1122. For example, a mapping engine 1126 in the map application 1124 can position map tiles, in a collection of map tiles describing the requested geographic region, for display on a display screen of the client device 1102. Additionally, the mapping engine 1126 can evaluate the map data 1122 to select labels to be displayed in the interactive geographic map. As described above, the mapping engine 1126 can select labels for display based on the respective popularity scores for the labels.

In some embodiments, the web server 1106, map server 1108, and similar components, can be considered to be part of the data plane 1110. The handling of all requests and responses, as well as the delivery of content between the client device 1102 and the map server 1108, can be handled by the web server 1106. The web server 1106 and map server 1108 are merely example components. However, more or fewer components can be used as structured code can be executed on any appropriate device or host machine as discussed elsewhere herein.

The data plane 1110 includes one or more resources, servers, hosts, instances, routers, switches, data stores, other similar components, or a combination thereof. The resources of the data plane 1110 are not limited to storing and providing access to data. Indeed, there may be several map servers, layers, or other elements, processes, or components, which may be chained or otherwise configured, and which can interact to perform tasks including, for example, obtaining data from an appropriate data store. In some embodiments, the term "data store" refers to any device or combination of devices capable of storing, accessing, and retrieving data, which may include any combination and number of data servers, databases, data storage devices, and data storage media, in any standard, distributed, or clustered environment.

The data stores of the data plane 1110 can include several separate data tables, databases, or other data storage mechanisms and media for storing data relating to a particular aspect. For example, the data plane 1110 illustrated includes mechanisms for storing geographic map data 1112 and user information 1116, which can be used to serve content. The data plane 1110 is also shown to include a mechanism for storing log data 1114, which can be used for purposes such as reporting and analysis. The data plane 1110 is operable, through logic associated therewith, to receive instructions from the map server 1108 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 11. Thus, the system 1100 in FIG. 11 is provided merely as one example, and does not limit the scope of the disclosure.

Figure 12:
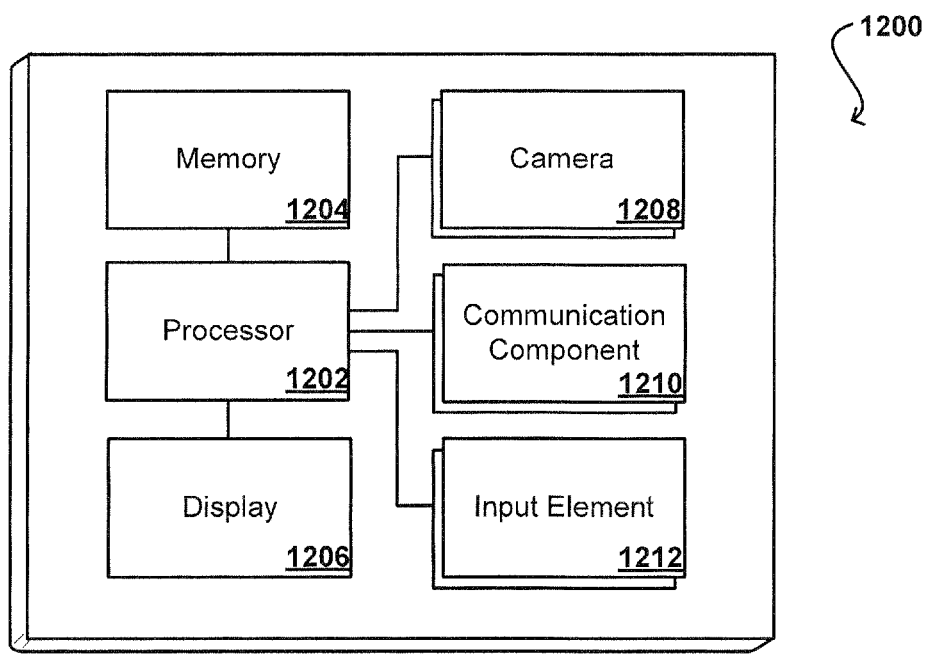
FIG. 12 illustrates example components of a client device.

FIG. 12 illustrates a logical arrangement of a set of general components of an example computing device 1200 such as the device 1102 described in reference to FIG. 11. In this example, the device includes a processor 1202 for executing instructions that can be stored in a memory device or element 1204. As would be apparent to one of ordinary skill in the art, the device can include many types of memory, data storage, or non-transitory computer-readable storage media, such as a first data storage for program instructions for execution by the processor 1202, a separate storage for images or data, a removable memory for sharing information with other devices, etc. The device typically will include some type of display element 1206, such as a touch screen or liquid crystal display (LCD), although devices such as portable media players might convey information via other means, such as through audio speakers. As discussed, the device in many embodiments will include at least one image capture element 1208 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 1212, such as a mono or stereo microphone or microphone array, operable to capture audio information from at least one primary direction. A microphone can be a uni- or omni-directional microphone as known for such devices.

In some embodiments, the computing device 1200 of FIG. 12 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1200 also can include at least one orientation or motion sensor 1210. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 1202, whereby the device can perform any of a number of actions described or suggested herein.

As an example, a computing device can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a display;
   a sensor;
   one or more processors; and
   memory storing instructions that, when executed by the one or more processors, cause the computing device to perform operations, comprising:
      rotating a geographic map on the display;
      in response to rotating the geographic map on the display, rotating on the display a label for a feature of the geographic map;
      determining a reference direction of the computing device based on an output of the sensor;
      determining, based on the reference direction of the computing device, a first threshold angle relative to the computing device;
      determining that an angle of the label relative to the computing device crossed the first threshold angle as the label rotated on the display when the label was in a first orientation;
      flipping an orientation of the label on the display from the first orientation to a second orientation in response to determining the angle of the label on the display crossed the first threshold angle;
      in response to flipping the orientation of the label from the first orientation to the second orientation, determining a second threshold angle by adjusting the first threshold angle by a predetermined amount in a first direction;
      determining that the angle of the label relative to the computing device crossed the second threshold angle as the label rotated on the display when the label was in the second orientation; and
      flipping the orientation of the label on the display from the second orientation to the first orientation in response to determining the angle of the label on the display crossed the second threshold angle.

2. The computing device of claim 1, wherein the memory stores additional instructions that, when executed by the one or more processors, cause the computing device to perform further operations comprising:
   identifying a change in an orientation of the computing device;
   rotating the geographic map on the display in response to identifying the change in the orientation of the computing device.

3. The computing device of claim 1, wherein determining the reference direction of the computing device comprises:
   processing the output of the sensor to determine a direction that is vertically up; and
   determining the reference direction based on the direction that is vertically up.

4. The computing device of claim 3, wherein the sensor comprises an accelerometer.

5. The computing device of claim 1, wherein determining the reference direction of the computing device comprises:
   using a head tracking technique to determine a direction of a head or eyes of a user; and
   determining the reference direction based on the direction of the head or eyes of the user.

6. The computing device of claim 1, wherein the memory stores additional instructions that, when executed by the one or more processors, further cause the computing device to perform a further operation comprising:
   in response to flipping the orientation of the label from the second orientation to the first orientation, determining the first threshold angle by adjusting the second threshold angle by the predetermined amount in a second direction.

7. A computer-implemented method for orienting labels in an interactive geographic map presented on a display of a computing device, the method comprising:
   receiving, from a map search system and at the computing device, map data that describes a geographic region, the map data including a collection of labels that each describes a feature that is located in the geographic region, each label being associated with a placement in an interactive geographic map that represents the geographic region;
   rotating the interactive geographic map on the display;
   in response to rotating the interactive geographic map on the display, rotating on the display a first label of the collection of labels;
   determining a reference direction of the computing device based on an output of a sensor of the computing device;
   determining, based on the reference direction of the computing device, a first threshold angle relative to the computing device;

determining that an angle of the first label relative to the computing device crossed the first threshold angle as the first label rotated on the display when the first label was in a first orientation;

flipping an orientation of the first label on the display from the first orientation to a second orientation in response to determining the angle of the first label on the display crossed the first threshold angle;

in response to flipping the orientation of the label from the first orientation to the second orientation, determining a second threshold angle by adjusting the first threshold angle by a predetermined amount in a first direction;

determining that the angle of the first label relative to the computing device crossed the second threshold angle as the first label rotated on the display when the first label was in the second orientation; and flipping the orientation of the first label on the display from the second orientation to the first second orientation in response to determining the angle of the first label on the display crossed the second threshold angle.

8. The computer-implemented method of claim 7, further comprising:

identifying a change in an orientation of the computing device;

rotating the interactive geographic map on the display in response identifying the change in the orientation of the computing device.

9. The computer-implemented method of claim 7, wherein determining the reference direction of the computing device comprises:

processing the output of the sensor to determine a direction that is vertically up; and determining the reference direction based on the direction that is vertically up.

10. The computer-implemented method of claim 9, wherein the sensor comprises an accelerometer, and processing the output of the sensor comprises processing an output of the accelerometer to determine the direction that is vertically up.

11. The computer-implemented method of claim 7, wherein determining the reference direction of the computing device comprises:

using a head tracking technique to determine a direction of a head or eyes of a user; and determining the reference direction based on the direction of the head or eyes of the user.

12. The computer-implemented method of claim 7, further comprising:

in response to flipping the orientation of the first label from the second orientation to the first orientation, determining the first threshold angle by adjusting the second threshold angle by the predetermined amount in a second direction.

* * * * *